United States Patent [19]

Goldstein

[11] Patent Number: 5,305,712

[45] Date of Patent: Apr. 26, 1994

[54] ANIMAL TETHER SYSTEM AND METHOD OF USE

[75] Inventor: Andrew H. Goldstein, Pittsburgh, Pa.

[73] Assignee: Allegheny-Singer Research Institute, Pittsburgh, Pa.

[21] Appl. No.: 983,505

[22] Filed: Nov. 30, 1992

[51] Int. Cl.$^5$ .................. A01K 27/00; A01K 29/00
[52] U.S. Cl. ................................ 119/784; 119/769; 604/4
[58] Field of Search ............ 119/120; 604/4, 93; 248/51; 128/899; 623/3

[56] References Cited

U.S. PATENT DOCUMENTS

| | | | |
|---|---|---|---|
| 3,313,289 | 4/1967 | Kapral | 604/93 |
| 3,868,956 | 3/1975 | Alfidi et al. | 128/899 X |
| 4,114,352 | 9/1978 | Horton et al. | 54/79.1 |
| 4,756,707 | 7/1988 | MacLeod et al. | 119/120 X |
| 5,078,714 | 1/1992 | Katims | 604/95 X |

*Primary Examiner*—Robert P. Swiatek
*Attorney, Agent, or Firm*—Ansel M. Schwartz

[57] ABSTRACT

A tether system for an animal. The tether system has an apparatus which is electrically or fluidically powered or monitored with greater than 200 milliamps of current. The tether system is also comprised of an area for the animal and a structure above the area. The tether system is comprised of an anchor for attachment to the structure. The tether system is also comprised of a mechanism for providing power to the apparatus to operate it. The providing mechanism is in electrical communication with the anchor and the apparatus. The anchor prevents entanglement of the power providing means or mechanism as the animal moves freely about the area. Preferably, the tether system also includes a mechanism for providing fluid to or from the animal. The fluid providing mechanism is fluidically connected to the anchor and the patient. Additionally, the tether system can include a mechanism for transmitting electrical signals from the animal. The transmitting mechanism is in electrical communication with the anchor and the animal. The present invention also pertains to a method for tethering an animal with an apparatus which is electrically powered. The method comprises the steps of attaching a first electrical conduction element to the apparatus of the animal so the first electrical conduction element extends from an anchor attached to a structure above and remote from the animal to the animal. Then, there is the step of providing current to the apparatus to power it. Next, there is the step of allowing the animal to freely walk around the area while connected to the first electrical conduction element extending down from the anchor attached to the structure above the animal in the area.

26 Claims, 4 Drawing Sheets

ANIMAL TETHER SYSTEM AND METHOD OF USE

FIELD OF THE INVENTION

The present invention is related to animal tether system. More specifically, the present invention is related to an animal tether system and method of use with respect to an electrically operated apparatus.

BACKGROUND OF THE INVENTION

Physiologic monitoring of animals, for example, with circulatory assist devices, often requires percutaneous electrical wires and fluid-filled catheters leading to stationary power consoles and meters. Animal mobility must be restricted to prevent entanglement and disruption of these lines. Although fluid/electrical swivels are available for signal transduction, they are not capable of carrying currents large enough for power transmission. Existing swivels are limited to continuous current capacity ceiling of approximately 200 milliamps. Consequently, chronic in vivo studies have necessitated that the animal be confined to a stanchion for the duration of the experiment, or that personnel continuously observe the animal to prevent entanglement of electrical wires which hang from a hook. Furthermore, existing swivels allow only a limited number of electrical wires to be used for monitoring or current transmission.

The present invention is directed to a unique tether system which greatly increases animal mobility during long-term studies with electrically powered devices, for instance, a circulatory assist device, and provides means or a mechanism for accommodating more than ten electrical circuits, and for accommodating electrical currents in excess of 200 milliamps.

SUMMARY OF THE INVENTION

The present invention pertains to a tether system for an animal. The system is comprised of an electrically powered or monitored apparatus implanted in or connected to the animal. The electrical apparatus is powered or monitored with greater than 200 milliamps of current. There is also an area for the animal and a structure above the area. The tether system is comprised of an anchor for attachment to the structure. The tether system is also comprised of means or a mechanism for providing power to the apparatus to operate it. The anchor prevents entanglement of the power providing means for mechanism as the animal moves freely about the area. The providing means or mechanism is in electrical communication with the anchor and the apparatus. Preferably, the tether system also includes means or a mechanism for transferring fluid to and from the animal. The fluid transferring means or mechanism is fluidically connected to the anchor and the animal. Additionally, the tether system can include means or a mechanism for transmitting electrical and fluid signals from the animal. The transmitting means or mechanism is in electrical and fluidic communication with the anchor and the animal.

The present invention also pertains to a method for tethering an animal with an implanted or connected apparatus which is electrically powered. The method comprises the steps of attaching a first electrical conduction element to the apparatus connected to or implanted in the animal so the first electrical conduction element extends from an anchor attached to a structure above and remote from the animal to the animal. Then, there is the step of providing current to the apparatus to power it. Next, there is the step of allowing the animal to freely walk around the area while connected to the first electrical conduction element extending down from the anchor attached to the structure above the animal in the area.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
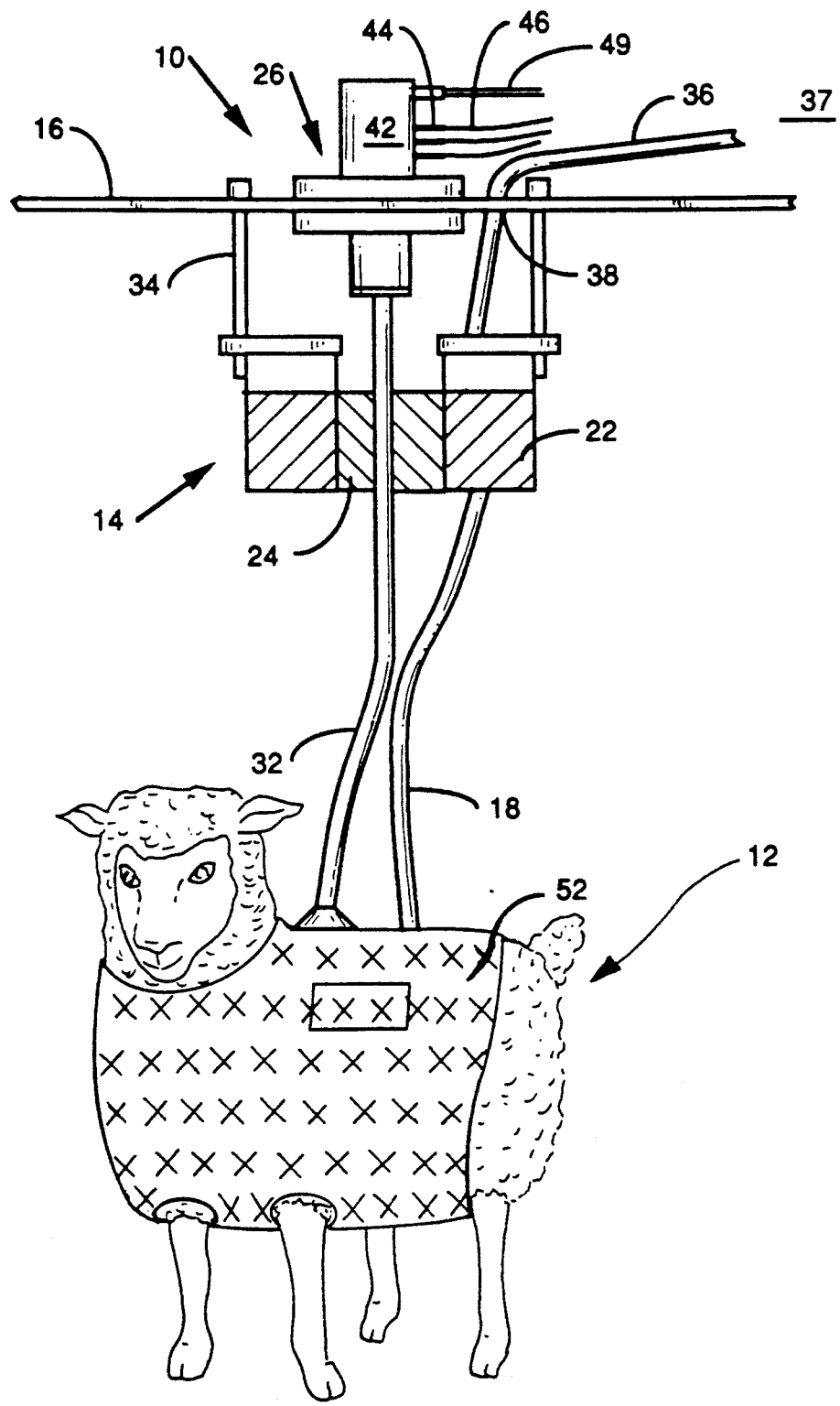
FIG. 1 is a schematic representation of a tether system of the present invention connected to an animal.

Referring now to the drawings wherein like reference numerals refer to similar or identical parts throughout the several views, and more specifically to FIG. 1 thereof, there is shown a tether system 10 for an animal 12. The tether system 10 is comprised of an apparatus, such as an artificial heart, circulatory assist device, muscle stimulator, drug delivery system, etc., which is electrically powered or monitored with greater than 200 milliamps of current. For purposes herein, the term apparatus is understood to mean any electrically powered apparatus that is implanted in or connected to the animal. The tether system 10 is also comprised of an area for the animal 12 and a structure above the area. The tether system 10 is comprised of an anchor 14 for attachment to a structure 16. The tether system 10 is also comprised of means or a mechanism for providing power to the apparatus to operate it. The providing means or mechanism is in electrical communication with the anchor 14 and the apparatus. The anchor 14 prevents entanglement of the power providing means or mechanism as the animal moves freely about the area.

The power providing means or mechanism preferably includes a first electrical conduction element 18 for transmitting current to the apparatus that can exceed 200 milliamps. The first electrical conduction element 18 is swivably and electrically connected to the anchor 14 and electrically connected to the apparatus.

The tether system 10 can also include means or a mechanism for fluidically providing fluid to the animal 12. The fluid providing means or mechanism is fluidically connected to the anchor 14 and the animal 12. The fluid providing means or mechanism preferably includes tubing 28 through which fluid flows to or from the animal 12 or relays fluid signals from the animal.

Figure 2:
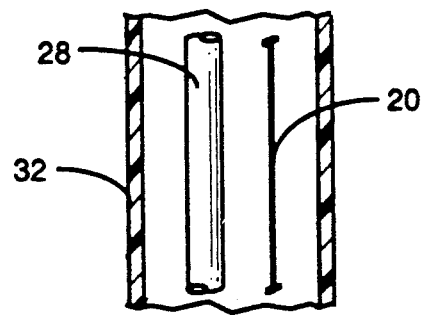
FIG. 2 is a cross sectional view of a portion of a casing of the tether system.

Additionally, the tether system 10 can include means or a mechanism for transmitting electrical signals from the animal 12. The transmitting means or mechanism is in electrical communication with the anchor 14 and the animal 12. The transmitting means or mechanism can preferably include a second electrical conduction element 20 for transmitting electrical signals from the animal 12, as shown in FIG. 2. The second electrical conduction element 20 is electrically connected to the animal and swivably and electrically connected to the anchor 14.

It should be noted that depending on the specific application, a conduction element can alternatively be an optical waveguide which can transmit optical signals such as optical digital signals. A photodiode in either the anchor 14 or with the animal 12 can produce the optical signals with the corresponding photoreceiver at the other end of the waveguide. In this way, information or energy can also be transmitted from or to the animal 12.

The anchor 14 preferably includes a first slip ring mechanism 22 having a channel 24 extending through it. The first electrical conduction element 18 is swivably connected to the first slip ring mechanism 22 as is well known in the art. The tubing 28 and the second electrical conduction element 20 extend through the channel 24 to the animal 12.

The anchor 14 also preferably includes a second slip ring/fluid swivel mechanism 26 to which the second conducting element 20 is swivably connected, as is well known in the art. The first slip ring mechanism 22 is preferably disposed between the second slip ring/fluid swivel mechanism 26 and the animal 12. The anchor 14 preferably also includes a swivable fluid seal mechanism 30. The tubing 28 is fluidically connected to the swivable fluid seal mechanism 30 as is well known in the art. The fluid seal mechanism 30 is integrated with the second slip ring/fluid swivel mechanism 26, as is well known in the art.

The tether system 10 can also include a casing 32 housing the second electrical conducting element 20 and the tubing 28. The casing 32 is connected to the animal 12 and the second slip ring/fluid swivel mechanism 26 and extends through the channel 24 and the first slip ring mechanism 22.

The present invention also pertains to a method for tethering an animal 12 with an apparatus which is electrically powered The method comprises the steps of (a) attaching the first electrical conduction element 18 to the apparatus of the animal 12 so the first electrical conduction element 18 extends from an anchor 14 attached to a structure above and remote from the animal 12 to the animal. The surface is above the air. Then, there is the step (b) of providing current to the apparatus to power it. Next, there is the step (c) of allowing the animal 12 to freely walk around the area while connected to the first electrical conduction element 18 extending down from the anchor 14 attached to the structure 16 above the animal 12 in the area.

After the step (a), there can also be the steps (d) of connecting tubing 28 which is extending down from the anchor 14 to the animal 12. Next, there is the step (e) of flowing a desired fluid through the tubing 28 to the animal 12 through the anchor 14 while the animal 12 is walking around the area. Also, there can be the step (i) of transmitting fluid or fluid signals away from the animal along the tubing 28 through the anchor 14.

After step (a), there can also be the step (f) of connecting the second electrical conduction element 20 to the animal 12 which is extending down from the anchor 14. Then, there can be the step (g) of transmitting electrical signals along the second electrical conducting element 20 through the anchor 14 from the animal 12. As mentioned above, the anchor 14 can include a first slip ring mechanism 22 having a channel 24 extending through it. The second electrical conduction element 20 and the tubing 28 extend down to the animal through the channel 24. The first electrical conduction element 18 is connected to the first slip ring mechanism 22. In such a case, the step (c) can include the step (h) of swiveling the first conduction element 18 about the first slip ring mechanism 22 as the animal 12 moves around the area.

The present invention also pertains to a tether system 10 for an animal 12. The tether system 10 comprises an anchor 14 for attachment to a structure 16. Additionally, the tether system 10 is comprised of at least 11 distinct electrical conduction elements which are electrically and swivably connected to the anchor 14 and electrically connected to the animal 12.

In the operation of the preferred embodiment, a tether system 10 is used to support an adult sheep with an implanted LVAD (left ventricle assist device). Anchor 14 of the tether system 10 is connected to a structure 16, such as a plexiglass plate fixed to a rigidly suspended plane or ceiling. The first slip ring mechanism 22 of the anchor 14 is attached to the ceiling with bolts 34 and spacers 71. Electrical power lines 36 extend through hole 38 in the ceiling from the cable run area 37 above the ceiling and are electrically connected to the first slip ring mechanism 22 to provide current to it. The first slip ring mechanism 22 is a Litton Poly-Scientific Part No. 4831-12F slip ring assembly with 5 amps per circuit, having 12 circuits and a 1½ inch diameter center bore. If so desired, a greater number (13-24) or fewer (1-11) circuits with greater current capacities can also be used. The range of current through the first conduction element 18 can be between 1 milliamp and 10 amps. The specific apparatus will dictate the current required to operate it.

Figure 4:
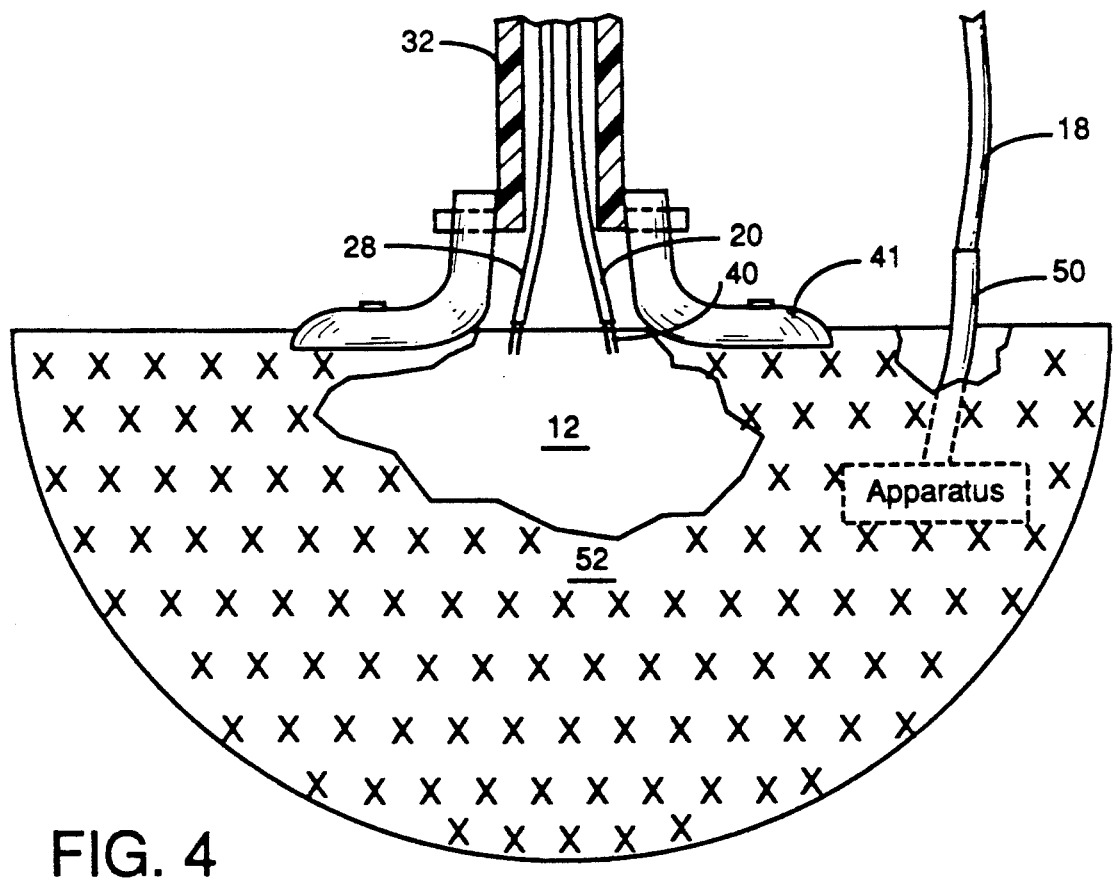
FIG. 4 is a schematic representation of the tubing and electrical transmission line and electrical power line connections of the tether system with the animal.
Figure 3:
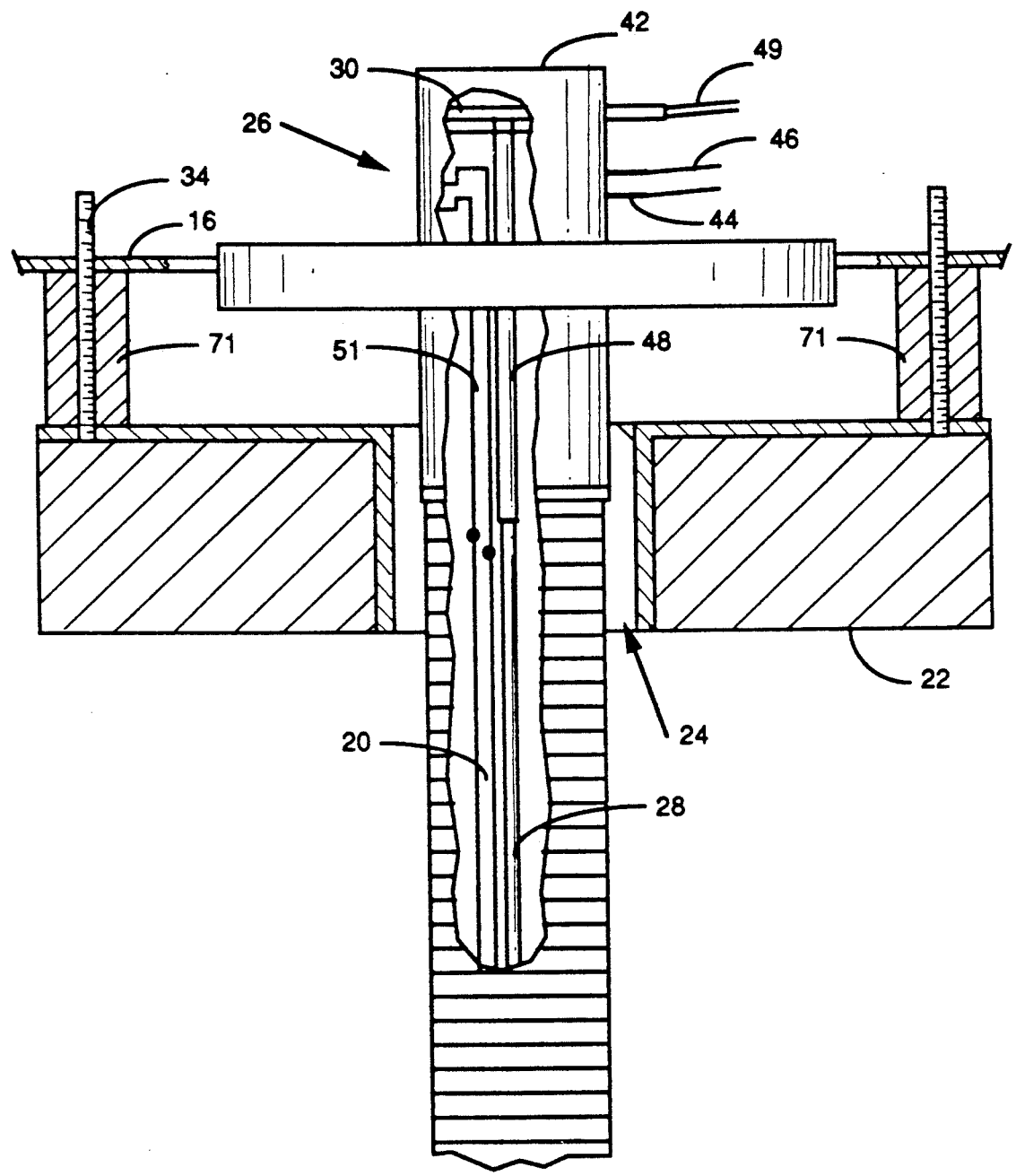
FIG. 3 is a schematic representation of a portion of the tether system which details the anchor

Also attached to the ceiling with an Alice King Chatham Medical Arts Mounting Nut Plate #080-00NP is a second slip ring mechanism 26 having 10 electrical circuits and 4 fluid lines. Note, the 10 electrical circuits herein, and the 12 above yield 22 total circuits. The second slip ring mechanism is an Alice King Chatham Medical Arts standard size swivel #17GA #080-0030-17GA. For this and the preceding described assemblies, any appropriate combination of bolts and nuts could substitute for the mounting nut plate. The second slip ring/fluid swivel mechanism 26 is attached to the ceiling such that it is centered over the center of the bore hole of the first slip mechanism 22 which defines the channel 24. As shown in FIG. 3, electrical leads 51 of the second slip ring mechanism 26 extend down therefrom and are electrically connected to respective second electrical conduction elements 20. The second electrical conduction elements 20 are also electrically connected to electrical leads 40 extending from the animal which provide, for instance, electrocardiogram information or continuous measurement of instantaneous pump flow rate, pump speed, and arterial, central venous and pulmonary artery pressure, as shown in FIG. 4. Pressurized lubrication to the pump (maximum 900 mm Hg) was likewise transmitted via the anchor 14. Intravenous drugs were likewise transmitted to the animal 12 via the anchor 14. Also, blood samples were drawn from the animal 12 via the anchor 14. To cap leads 44 of cap 42 of the second slip ring/fluid swivel mechanism 26 are connected electrical transmission lines 46 which extend along the cable run area 37 above the ceiling. The electrical transmission lines 46 carry electrical signals which emanate from the animal 12 to a desired monitoring location. Likewise the electrical transmission lines 46 may carry electrical current through the second slip ring/fluid swivel assembly 26 to the animal provided this current is not in excess of 200 milliamps, which is understood to be a limitation of Alice King Chatham Medical Arts standard size swivel.

Additionally, tubing outlets 48 of the second slip ring mechanism 26 extend down therefrom. The tubing 28 is fluidically connected to the respective tubing outlets 48 and also to the animal 12 to provide desired fluids such as saline, antibiotics, medications, etc. as indicated or to allow for blood sampling The tubing 28 and second electrical conduction elements 20 extend from the second slip ring/fluid swivel mechanism through the channel 24 of the first slip ring mechanism 22 to the animal 12. The tubing 28 forms as many as 4 distinct fluid channels. The second electrical conduction element contains as many as ten distinct electrical wires.

A plate 41 positioned on the animal 12 or fixed to a jacket 52 worn by the animal, as is well known in the art and shown in FIG. 4, has the casing 32 attached to it. The tubing 28 and the second electrical conduction element 20 pass through the casing 32 and plate 41 in order for fluids to be distributed into or removed from the animal, or signals to be transmitted to or away from the animal, respectively. From the first slip ring mechanism 22, the first electrical conduction elements 18 extend down to animal leads 50 which extend from the apparatus. Current is received to power the apparatus through animal leads 50. The animal leads 50 are connected to the first electrical conduction elements 18 outside of the plate 41 through which the second electrical conduction element 20 and tubing 28 are connected to the animal 12.

Ceiling tubing 49 which is connected to the cap 42 of the second slip ring mechanism 26 provides desired fluids thereto. In the second slip ring/fluid swivel mechanism 26 is a swivable fluid seal mechanism 30 which is connected to tubing outlet 48. In turn, the tubing outlets 48 are fluidically connected to the tubing 28 which extends through the channel 24 inside the casing 32.

The casing 32 is made of flexible steel. The casing 32 is preferably an Alice King Chatham Medical Arts ½ inch diameter double wall tether 72 inch long Part #500-2072. The length is adapted to the height of the anchor 14 above the animal 12. In the casing 32 is housed the tubing 28 and the second electrical conduction elements 20. The casing is attached to the second slip ring/fluid swivel 26, extends through the channel 24 of the first slip ring mechanism 22 and may be connected to the animal 12 by way of a jacket 52 which has been placed around the animal 12 as is well known in the art.

Once the tether system 10 is in proper connection with the animal 12 and ceiling, the animal 12 is free to move around the area, which is a 30 ft² pen, essentially being held only by the tether system 10 casing 32 which acts as a leash. As the animal 12 moves around the area, continuous electrical current in the range of 3–10 watts is provided to the animal by way of first electrical lines 36 providing current to the first slip ring mechanism 22. In turn, the first slip ring mechanism provides current to the first conduction elements 18. The first electrical conduction elements 18 are connected to the animal leads 50 of the apparatus and pass the current therethrough to the apparatus to operate it. When the animal 12 moves around, the first electrical conduction elements 18 swivel around the first swivel mechanism 22, as is well known in the art, so that no torsion is experienced by the first conduction element 18. By precluding the creation of torsion, there is no twisting which might separate the overall connection between the first slip ring mechanism 22 and the power leads, resulting in loss of current to the apparatus placed on or in the animal 12.

Similarly, during movement of the animal, the fluid tubing 28 swivels with respect to the fluid swivel mechanism 30 as is well known in the art preventing any kinks or breakage of the tubing connection resulting in loss of fluid supply to or from the animal 12. Also, second conduction elements 20 inside the casing 32, which are connected to the animal 12 and extend through the channel 24 to the second slip ring/fluid swivel mechanism 26, swivel with respect to the second slip ring/fluid swivel mechanism 26 during movement of the animal 12 thus preventing breakage of any electrical connections to prevent signals to or from the animal 12 from being transmitted. By the tubing 28 and second electrical conduction element 20 being disposed inside the casing 32, torque is further prevented from being applied to the tubing 28 or to the second electrical conduction element 20. The casing 32 essentially absorbs such torque and protects the tubing 28 and second electrical conduction elements 20. The casing 32 essentially moves in unison with the jacket 52 which is about the animal 12 during the animal's 12 movement. The first electrical conduction elements 18 can be taped or secured to the outside of the casing 32. In this arrangement, the first slip ring mechanism 22 will rotate in unison with the second slip ring/fluid swivel mechanism 26. Thus, no twisting of the first conduction element 18 will occur relative to the casing 32 or the tubing 28 or second conduction elements 20 contained therein.

Figure 5:
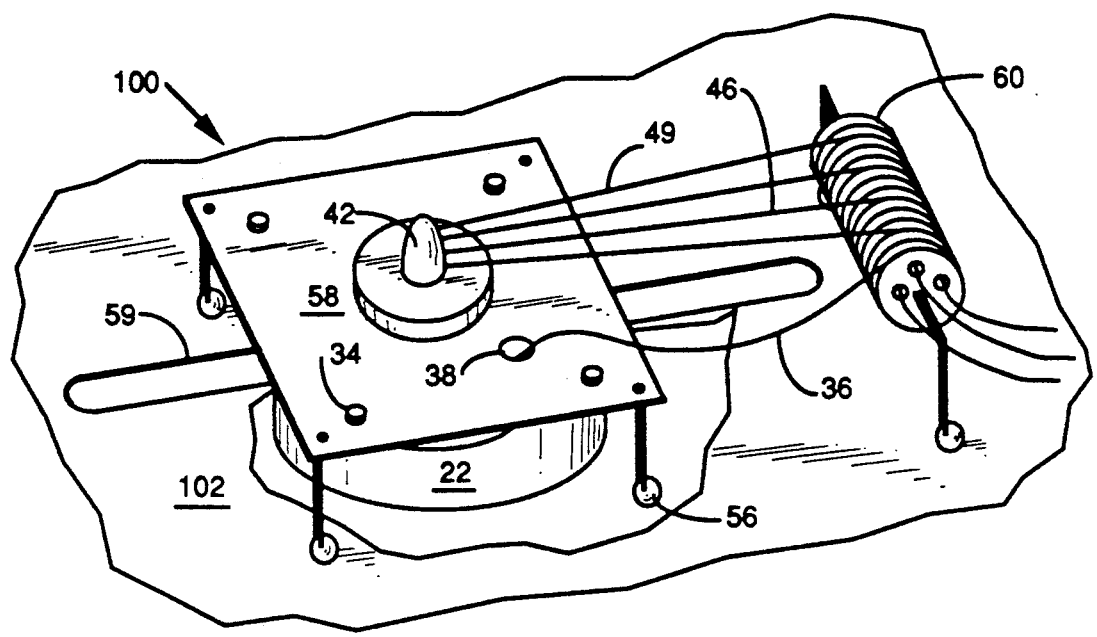
FIG. 5 is a schematic representation of a portion of an alternative embodiment of the tether system of the present invention that allows the system to move.

In an alternative embodiment and as shown in FIG. 5, there is shown a tether system 100 for an animal 12. The tether system 100 comprises an anchor 14. The anchor 14 has means or a mechanism for movement. The tether system 100 is also comprised of a support member 102. The anchor 14 is disposed with respect to the support member 102 so that it can move along the support member 102. Additionally, the tether system 100 is comprised of means or a mechanism for providing power to the animal 12 from the anchor 14. The electrical power providing means or mechanism is in contact with the anchor 14 and the animal 12 such that as the animal 12 moves, the anchor 14 also moves. The moving means or mechanism preferably includes casters 56 which are in communication with a plate 58. The anchor 14 can be placed on casters 56 with the first slip ring mechanism bolted to a plate 58 which extends from the second slip ring mechanism 26. The casters 56 are also connected to the plate 58. The support member 102 can include a slot 59 disposed in the ceiling along which the anchor 14 can roll so the animal 12 is given further mobility with respect to translation along the slot 59, and can rotate or turn around as described above. The electrical power providing means or mechanism can include tubing 28, first conduction elements 18 and/or second conduction elements 20. The electrical lines 36, the ceiling tubing 49 and the electrical leads 46 can be placed on a spool 60 which has a spring mechanism, as is well known in the art. The spool provides additional length of ceiling tubing 49 or electrical transmission lines 46, or electrical power lines 36 when so required, or draws in any slack of the same when the animal 12 is moving the anchor 14 by way of the casing 32 closer towards the spool 60.

Figure 6:
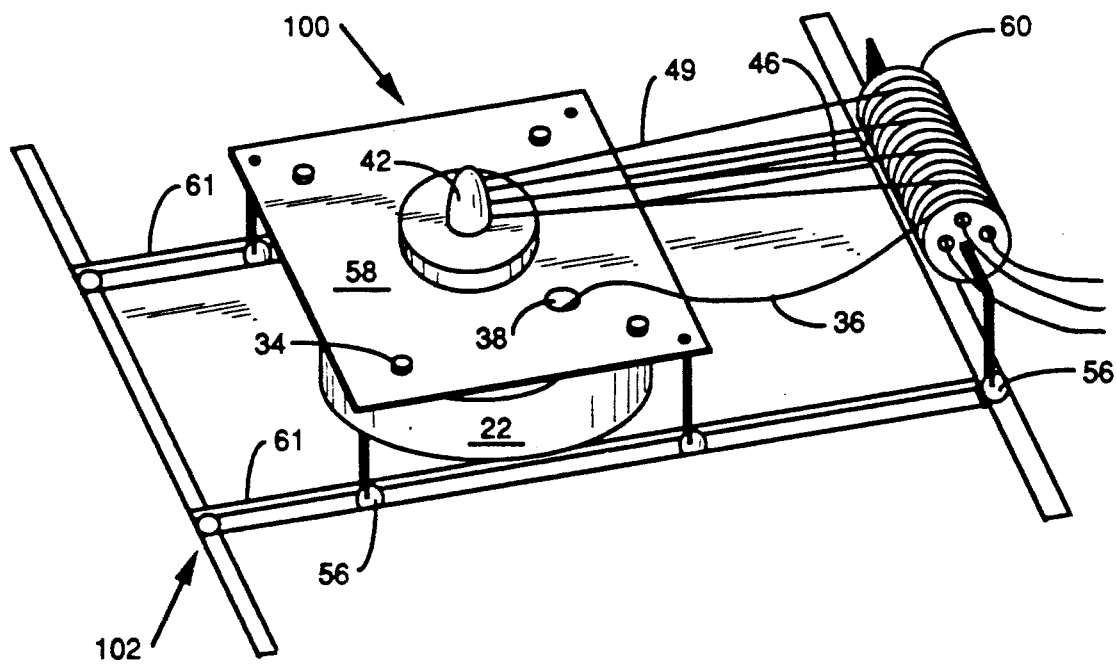
FIG. 6 is a schematic representation of a portion of another alternative embodiment of the tether system of the present invention that allows the system to move.

Additionally, as shown in FIG. 6, to achieve mobility of the anchor in two axes, the slot 59 of FIG. 5 can be replaced by parallel bars 61 that are themselves mounted on casters 56 so that they can also roll in an orthogonal axis to the anchor. The casters 56 can be embedded between walls of the parallel bars 61 which essentially form a 3-sided enclosure that is open at the top to allow the anchor 14 to move, or the casters 56 can be in grooves to maintain them along their track.

Although the invention has been described in detail in the foregoing embodiments for the purpose of illustration, it is to be understood that such detail is solely for that purpose and that variations can be made therein by those skilled in the art without departing from the spirit and scope of the invention except as is may be described by the following claims.

What is claimed is:

1. A tether system for an animal comprising:
   an apparatus in contact with the animal which is electrically powered or monitored with greater than 200 milliamps of current;
   an area for the animal;
   a structure above the area;
   an anchor for attachment to the structure above the area; and
   means or a mechanism for providing power to the apparatus to operate it, said providing means or mechanism in electrical communication with the anchor and the apparatus, said anchor preventing entanglement of the power providing means or mechanism as the animal moves freely about the area.

2. A tether system as described in claim 1 including means or a mechanism for providing fluid to the animal, said fluid providing means or mechanism fluidically connected to the anchor and the animal.

3. A tether system as described in claim 2 including means or a mechanism for transmitting electrical signals to or from the animal, said transmitting means or mechanism in electrical communication with the anchor and the animal.

4. A tether system as described in claim 3 wherein the power providing means or mechanism includes a first electrical conduction element for transmitting greater than 200 milliamps of current to the apparatus, said first electrical conduction element swivably and electrically connected to the anchor and electrically connected to the apparatus.

5. A tether system as described in claim 4 wherein the transmitting means or mechanism includes a second electrical conduction element for transmitting electrical signals to or from the animal, said second electrical conduction element electrically connected to the animal and swivably and electrically connected to the anchor.

6. A tether system as described in claim 5 wherein the anchor includes a first slip ring mechanism having a channel extending through it, said first electrical conduction element swivably connected to the first slip ring mechanism, said fluid providing means or mechanism and said second electrical conduction element extending through the channel to the animal.

7. A tether system as described in claim 6 wherein the anchor includes a second slip ring mechanism to which the second conducting element is swivably connected, said first slip ring mechanism disposed between the second slip ring mechanism and the animal and adjacent to the second slip ring mechanism.

8. A tether system as described in claim 7 wherein the fluid providing means or mechanism includes tubing through which fluid flows or transmits signals to or from the animal.

9. A tether system as described in claim 8 wherein the anchor includes a swivable fluid seal mechanism, said tubing fluidically connected to the fluid seal mechanism, said fluid seal mechanism adjacent to the second slip ring mechanism.

10. A tether system as described in claim 9 including a casing housing the second electrical conduction element and the tubing, said casing connected to the animal and the second slip ring mechanism and extending through the channel in the first slip ring mechanism.

11. A method for tethering an animal with an apparatus which is electrically powered or monitored comprising the steps of:
    (a) attaching a first electrical conduction element to the apparatus of the animal so the first electrical conduction element extends from an anchor attached to a structure above and remote from the animal to the animal, said structure above an area for the animal;
    (b) providing current to the apparatus to power it; and
    (c) allowing the animal to freely walk around the area while connected to the first electrical conduction element extending down from the anchor attached to the structure above and remote from the animal in the area.

12. A method as described in claim 11 including after step (a), the steps of:
    (d) connecting tubing to the animal which is extending down form the anchor;
    (e) flowing a desired fluid through the tubing to or from the animal through the anchor while the animal is walking around the area.

13. A method as described in claim 12 including after step (a), the steps of (f) connecting a second electrical conduction element to the animal which is extending down from the anchor, (g) transmitting electrical signals along the second electrical conduction element through the anchor to or from the animal.

14. A method as described in claim 13 wherein the anchor includes a first slip ring mechanism having a channel extending through it, said second electrical conduction elements and said tubing extending down to the animal through the channel, said first electrical conduction element connected to the first slip ring mechanism; and wherein the step (c) includes the step of (h) swiveling the first conduction element about the first slip ring mechanism as the animal moves around the room.

15. A method as described in claim 14 including after the step (e), there is the step (i) of transmitting fluid or fluid signals away from the animal along the tubing through the anchor.

16. A tether system for an animal comprising:
    an anchor for attachment to a structure; and
    at least 11 distinct electrical conduction elements which are electrically and swivably connected to the anchor and electrically connected to the animal.

17. A tether system for an animal comprising:

an apparatus in contact with the animal which is electrically powered with greater than 200 milliamps of current;

an anchor, said anchor having means or a mechanism for movement;

a support member, said anchor disposed with respect to the support member so it can move along the support member; and means or a mechanism for providing electrical power to the electrically powered apparatus from the anchor, said electrical power providing means or mechanism in contact with the anchor and the animal such that as the animal moves, the anchor moves with it.

18. A tether system for an animal comprising:

an apparatus in contact with the animal which is electrically powered or monitored with greater than 200 milliamps of current;

an anchor for attachment to a structure;

means or a mechanism for providing power to the apparatus to operate it, said power providing means or mechanism includes a first electrical conduction element for transmitting greater than 200 milliamps of current to the apparatus, said first electrical conduction element swivably and electrically connected to the anchor and electrically connected to the apparatus;

means or a mechanism for providing fluid to the animal, said fluid providing means or mechanism fluidically connected to the anchor and the animal; and means or a mechanism for transmitting electrical signals to or from the animal, said transmitting means or mechanism in electrical communication with the anchor and the animal.

19. A tether system as described in claim 18 wherein the transmitting means or mechanism includes a second electrical conduction element for transmitting electrical signals to or from the animal, said second electrical conduction element electrically connected to the animal and swivably and electrically connected to the anchor.

20. A tether system as described in claim 19 wherein the anchor includes a first slip ring mechanism having a channel extending through it, said first electrical conduction element swivably connected to the first slip ring mechanism, said fluid providing means or mechanism and said second electrical conduction element extending through the channel to the animal.

21. A tether system as described in claim 20 wherein the anchor includes a second slip ring mechanism to which the second conducting element is swivably connected, said first slip ring mechanism disposed between the second slip ring mechanism and the animal and adjacent to the second slip ring mechanism.

22. A tether system as described in claim 21 wherein the fluid providing means or mechanism includes tubing through which fluid flows or transmits signals to or from the animal.

23. A tether system as described in claim 22 wherein the anchor includes a swivable fluid seal mechanism, said tubing fluidically connected to the fluid seal mechanism, said fluid seal mechanism adjacent to the second slip ring mechanism.

24. A tether system as described in claim 23 including a casing housing the second electrical conduction element and the tubing, said casing connected to the animal and the second slip ring mechanism and extending through the channel in the first slip ring mechanism.

25. A method for tethering an animal with an apparatus which is electrically powered or monitored comprising the steps of:

(a) attaching a first electrical conduction element to the apparatus of the animal so the first electrical conduction element extends from an anchor above the animal to the animal;

(b) providing current to the apparatus to power it;

(c) connecting tubing to the animal which is extending down from the anchor;

(d) flowing a desired fluid through the tubing to or from the animal through the anchor while the animal is walking around an area;

(e) connecting a second electrical conduction element to the animal which is extending down from the anchor;

(f) transmitting electrical signals along the second electrical conduction element through the anchor to or from the animal;

(g) allowing the animal to freely walk around an area in the room while connected to the first electrical conduction element extending down from the anchor attached to a structure above the animal in the room wherein the anchor includes a first slip ring mechanism having a channel extending through it, said second electrical conduction elements and said tubing extending down to the animal through the channel, said first electrical conduction element connected to the first slip ring mechanism; and (h) swiveling about the first slip ring mechanism as the animal moves around the area in the room.

26. A method as described in claim 25 including after the step (d), there is the step (h) of transmitting fluid or fluid signals away from the animal along the tubing through the anchor.

* * * * *